(12) United States Patent
Inbar et al.

(10) Patent No.: US 6,178,672 B1
(45) Date of Patent: Jan. 30, 2001

(54) AUTOMATIC TRANSPARENCY MASKING

(75) Inventors: Dan Inbar; Giora Teltsch, both of Haifa; Hanan Wolf, Habonim; Eran Shaffir, Haifa, all of (IL)

(73) Assignee: Smartlight Ltd., Yokneam Elit (IL)

( * ) Notice: Under 35 U.S.C. 154(b), the term of this patent shall be extended for 0 days.

(21) Appl. No.: 08/961,022

(22) Filed: Oct. 30, 1997

Related U.S. Application Data

(63) Continuation of application No. PCT/EP96/01878, filed on May 2, 1996.
(60) Provisional application No. 60/001,819, filed on Aug. 1, 1995.

(30) Foreign Application Priority Data

May 5, 1995 (IL) ........................................................ 113624

(51) Int. Cl.⁷ .................................................. G02B 27/02
(52) U.S. Cl. .................................. 40/361; 40/367; 40/564
(58) Field of Search ............................. 40/361, 362, 367, 40/564, 574; 362/19; 353/20, 22, 23; 359/494, 500

(56) References Cited

U.S. PATENT DOCUMENTS

| 2,174,269 | * | 9/1939 | Land | 40/548 X |
|---|---|---|---|---|
| 2,854,335 | * | 9/1958 | Mahler | 359/494 X |
| 2,998,667 | * | 9/1961 | Darnell et al. | 40/564 |
| 3,321,905 | * | 5/1967 | Krebs | 40/548 X |
| 3,714,413 | | 1/1973 | Craig . | |
| 4,002,914 | | 1/1977 | Macovski . | |
| 4,859,994 | | 8/1989 | Zola et al. . | |

FOREIGN PATENT DOCUMENTS

| 1961126 | 12/1969 | (DE) . |
|---|---|---|
| WO91/10152 | 7/1991 | (WO) . |

OTHER PUBLICATIONS

R. Bollen et al: "Viewer"; Research Disclosure No 28049, Havant GB; Aug. 1987; p. 504 XP002012469.

\* cited by examiner

*Primary Examiner*—Anthony Knight
*Assistant Examiner*—James M. Hewitt
(74) *Attorney, Agent, or Firm*—Fenster & Company Patent Attorneys, Ltd.

(57) ABSTRACT

A method for viewing transparencies comprising backlighting a transparency with polarized light and viewing the transparency through a polarizer. Preferably, the polarization axis of the backlighting and the polarization axis of the polarizer are oriented at about 90 degrees to each other. The transparency is oriented so that a substantial amount of polarized backlighting passes through the transparency and the polarizer. Also disclosed are apparatus for viewing a transparency using polarized backlighting.

29 Claims, 10 Drawing Sheets

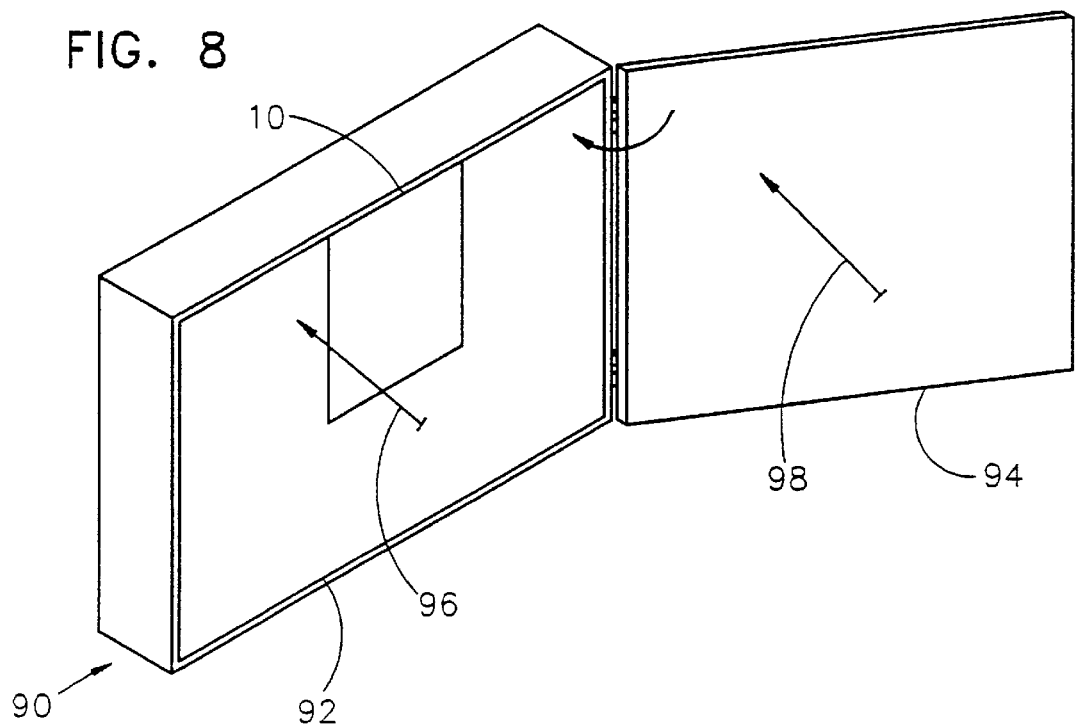
FIG. 8
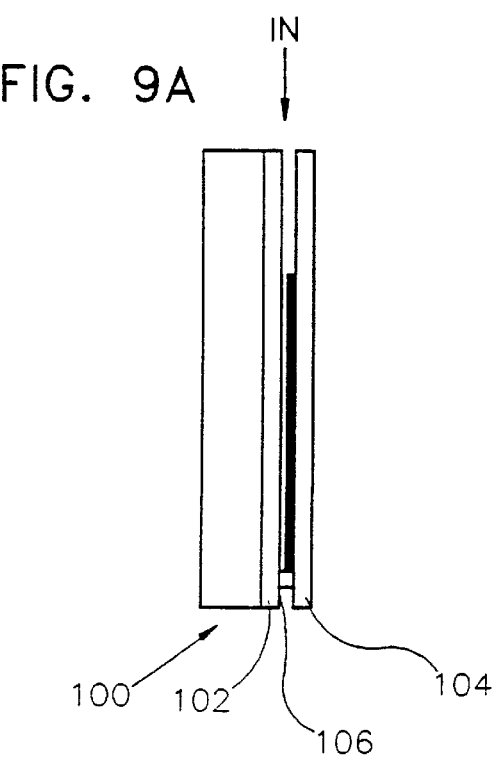
FIG. 9A
FIG. 9B

AUTOMATIC TRANSPARENCY MASKING

RELATED APPLICATIONS

The present application is a continuation of PCT Application PCT/EP96/01878, filed May 2, 1996 and claims the benefit, under 35 U.S.C. §119(e) of U.S. Provisional application 60/001,819, filed Aug. 1, 1995.

FIELD OF THE INVENTION

This invention is generally related to the field of transparency viewing apparatus, and more specifically to the field of transparency viewing apparatus using sheet polarizers.

BACKGROUND OF THE INVENTION

The use of backlit viewboxes for viewing transparencies, particularly for medical transparencies, is known in the art. It is also known in the art to use viewboxes which incidentally emit polarized light. Examples of viewboxes which emit polarized light are shown in U.S. patent application Ser. No. 08/348,958 filed Nov. 28, 1994 and in a PCT publication PCT/WO91/10152, titled "Self Masking Transparency Viewing Apparatus" and published on Jul. 11, 1991, the disclosures of which are incorporated herein by reference.

An important issue in transparency viewing is minimizing the amount of light from areas not covered by the transparency. Owing to certain psychophysical properties of the human visual system, it is more difficult for a viewer to discern low contrast details at lighting levels different from those to which the viewers eye is adapted. Since the eye adapts to all the light entering the eye and not just to light that is at the view point, reduction in extraneous light enables the eye to better adapt to lighting levels in the transparency. This adaptation enables the full range of sensitivity of the eye to be applied to the low contrast details in the transparency. It can also be appreciated why transparencies are usually viewed in relatively dark rooms.

A previous application, "Self Masking Transparency Viewing Apparatus," published as PCT/WO91/10152 on Jul. 11, 1991 and assigned to the same assignee, describes a system using a CCD camera and a controller to detect at least the edges of a film transparency placed on an LCA (Liquid Crystal Array) based viewbox. In operation, images are acquired through the camera and then analyzed by the system. The controller then masks the backlighting to those portions of the film or of the display surface that are of no interest to the viewer. A similar and more advanced device is described in unpublished U.S. patent application Ser. No. 08/348,958 filed Nov. 28, 1994.

However, such devices are relatively complex and usually require replacing existing viewboxes with new viewboxes.

Transparencies for X-ray imaging are typically manufactured by depositing light sensitive materials on a plastic sheet and then cutting the sheet down to the required transparency size. Usually, the plastic sheet is taken from a continuous roll of stretched plastic and the transparencies, which are usually rectangular, are cut so that their edges are parallel to the edges of the plastic sheet.

SUMMARY OF THE INVENTION

It is an object of some preferred embodiments of the present invention to provide an improved method for viewing transparencies which does not require major changes in existing equipment. When viewing transparencies using some preferred embodiments of the present invention, light from portions of the viewbox not covered by transparency is substantially attenuated compared to light from portions covered by the transparency. Thus, the transparency can be viewed by a viewer without his being dazzled by extraneous light.

It is known in the art that when two linear polarizers are placed so that their polarization axes are at about 90° to each other, very little light passes through them. It is also known to use such crossed polarizers for analyzing stress in transparent objects.

The inventors have found that when a transparency, such as those used for X-ray imaging, is placed between two crossed polarizers, light passes through portions of the crossed polarizers containing the transparency. Preferably, the transparency is placed so that its edges are at 45° to the polarization axes of the polarizers. The inventors have found that since most transparencies are manufactured from stretched plastic, usually polyethylene, they do not have an isoradial effect on polarized light. Instead, it appears that stretched plastic acts as a retardant layer, with an ordinary and an extraordinary optical axis. These axes are oriented parallel and perpendicular to the stretch direction. The term preferred retardation axis, as used herein, refers to either the ordinary or the extraordinary retardation axis. When polarized light, having a polarization axis which is not substantially parallel or perpendicular to the preferred retardation axis of the plastic, passes through the plastic, it is converted into elliptically polarized light. Elliptically polarized light is only partially attenuated by the second polarizer, which is why some light passes through portions with overlap between the transparency and the polarizers.

Most transparencies are rectangular and are cut parallel to the stretch direction. This means the edges of most transparencies are parallel or perpendicular to the preferred retardation axis. Thus, if transparencies are oriented so that their edges are at 45° to the polarization axes of the polarizers, the transparency's preferred retardation axis is also generally at 45° to the polarization axes of the polarizers.

The inventors have also found that in order to reduce moire patterns caused by uneven stress within the polarizers and the transparencies, it is useful to apply jitter to one of the polarizers. Preferably, the jittering has a rotational component so that the angle between the polarization axes of the two polarizers changes. Alternatively, both polarizers are jittered relative to the transparency. Alternatively, the polarization axis of the polarized light passing through one of the polarizers is jittered using an LPR (Light Polarization Rotator), preferably, an LC (Liquid Crystal) without face polarizers.

An alternative method of reducing moire patterns is to use polarizers which allow some light to pass even if it polarized perpendicular to the polarization axis of the polarizers. One way to achieve this effect is to use imperfect polarizers. A small but significant amount of unpolarized light washes out the moire patterns. However, while this light does reduce the contrast between the light passing through the transparency and the light that passes only through the polarizers, the resultant contrast reduction appears to be acceptable. Alternatively, a diffuser is placed between the transparency and one of the polarizers, since a diffuser partially depolarizes polarized light.

A preferred embodiment of the present invention uses a viewbox which has a first polarizer on its display surface (behind the film) and a second polarizer which is mounted on eye-glasses worn by viewers. Alternatively, other head mounted or hand held polarizers are used.

In another preferred embodiment of the present invention the second polarizer is mounted on a transparent cover, so that transparencies can be placed on the inside surface of the cover or on the display surface when the cover is open. When the cover is closed, the transparency is located between two polarizers. The cover can, for example, have a horizontal or vertical hinge or comprise a sliding cover.

In yet another preferred embodiment of the present invention, the second polarizer is mounted in front of the display surface and forms a narrow space between the polarizer and the display surface. Preferably, transparencies are attached to a mounting device and slipped in from the top of the narrow space. The mounting is also used to remove the transparencies. Alternatively, the bottom of the narrow space is movable when removal of the transparencies is desired. When the bottom is moved, the transparencies drop out of the space. Another alternative is to slip the transparencies into the narrow space from its side, either by hand or on a sliding mount.

In a further preferred embodiment of the present invention a retractable sliding mount is used to insert transparencies into the narrow space. Preferably, the sliding mount slides into the narrow space through its bottom opening. Preferably, the sliding mount is retractable with a spring or counter weights. Alternatively, a motorized feeder is used to insert the transparencies into the narrow space.

There is also provided, according to a preferred embodiment of the present invention, an envelope for viewing transparencies. The envelope has a first polarizer on its front face and a second polarizer on its back face. When a transparency is placed in the envelope and then placed on a simple prior art viewbox or in front of a light source, light passes only through the transparency and not through any portion of the envelope not including the transparency. The envelope may be economically formed by folding a sheet polarizer along an axis which is at 45° to the polarizer's polarization axis and sealing two edges. The envelope size is preferably the size of a viewbox display surface and is preferably used to transform an ordinary viewbox into a polarizing viewbox.

Alternatively, the envelope has only one polarizing face, the other polarizer being permanently mounted on the viewbox. In this case, if the clear material forming the other face of the envelope has a preferred retardation axis, it is preferably aligned parallel to the polarization axis of the polarizer mounted on the viewbox.

There is also provided, according to a preferred embodiment of the present invention, a method of creating a polarizing viewbox comprising, providing a viewbox and placing a polarizer on its display surface. Alternatively, the display surface is replaced with a polarizer. Preferably, the light sources in the viewbox are intensified to compensate for the light loss through the polarizer.

It is known in the art to use an alternator to sequentially show a large number of transparencies. In a preferred embodiment of the present invention, a first polarizer is mounted directly on the display surface of the alternator and a second polarizer is mounted in front of the display surface, so that the alternator mechanism places the transparencies between the two polarizers. In one type of alternator the transparencies are mounted on a long clear sheet. Preferably, this sheet comprises one of the polarizers. Alternatively, the sheet is adapted or oriented so that it does not substantially affect the polarization of the polarized light passing through it.

BRIEF DESCRIPTION OF THE DRAWINGS

FIG. 8 shows another preferred embodiment of the present invention including a side opening cover;

FIG. 9A–9E, show preferred embodiments of the present invention wherein a transparency is slipped between two polarizers.

DETAILED DESCRIPTION OF THE PREFERRED EMBODIMENT

Figure 1:
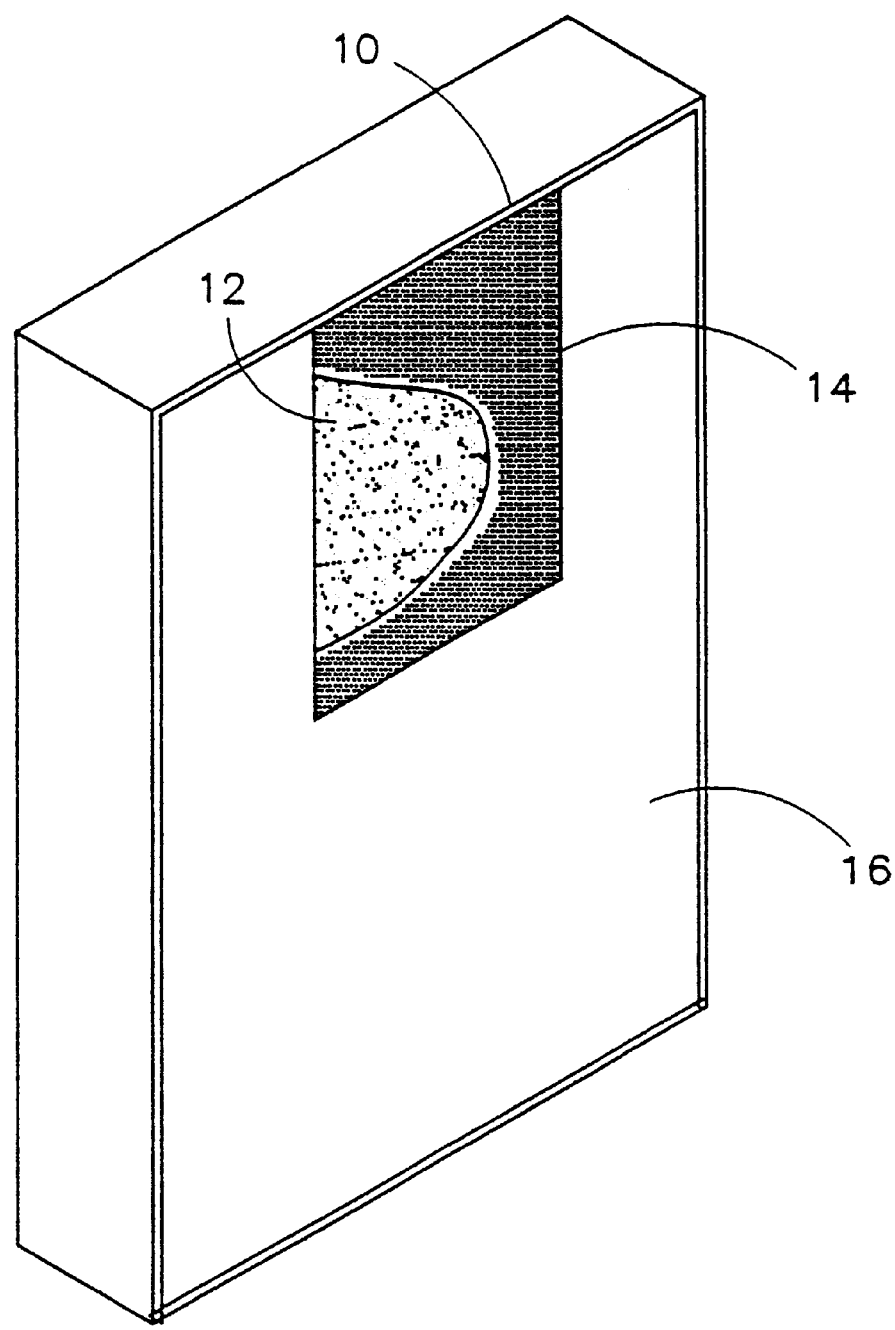
FIG. 1 is a schematic front view of a prior art viewbox.

FIG. 1 shows a prior art viewbox 18. A transparency 10 having a plurality of relatively lighter areas 12 and a plurality of darker areas 14 is placed on a backlit display surface 16. As shown in FIG. 1, both areas 12 and areas 14 are darker than uncovered portions of display surface 16. An operator interested in examining areas 12 and 14 of transparency 10 is dazzled by the flood of light from uncovered portions of display 16. Other, more complicated prior art devices, such as those described in the background section, detect the edges of transparency 10 and backlight only transparency 10.

It is known that a pair of polarizers whose polarization axes are perpendicular to each other attenuate incident light. The inventors have found that light is less attenuated if a transparency is placed between the pair of polarizers.

Figure 2A:
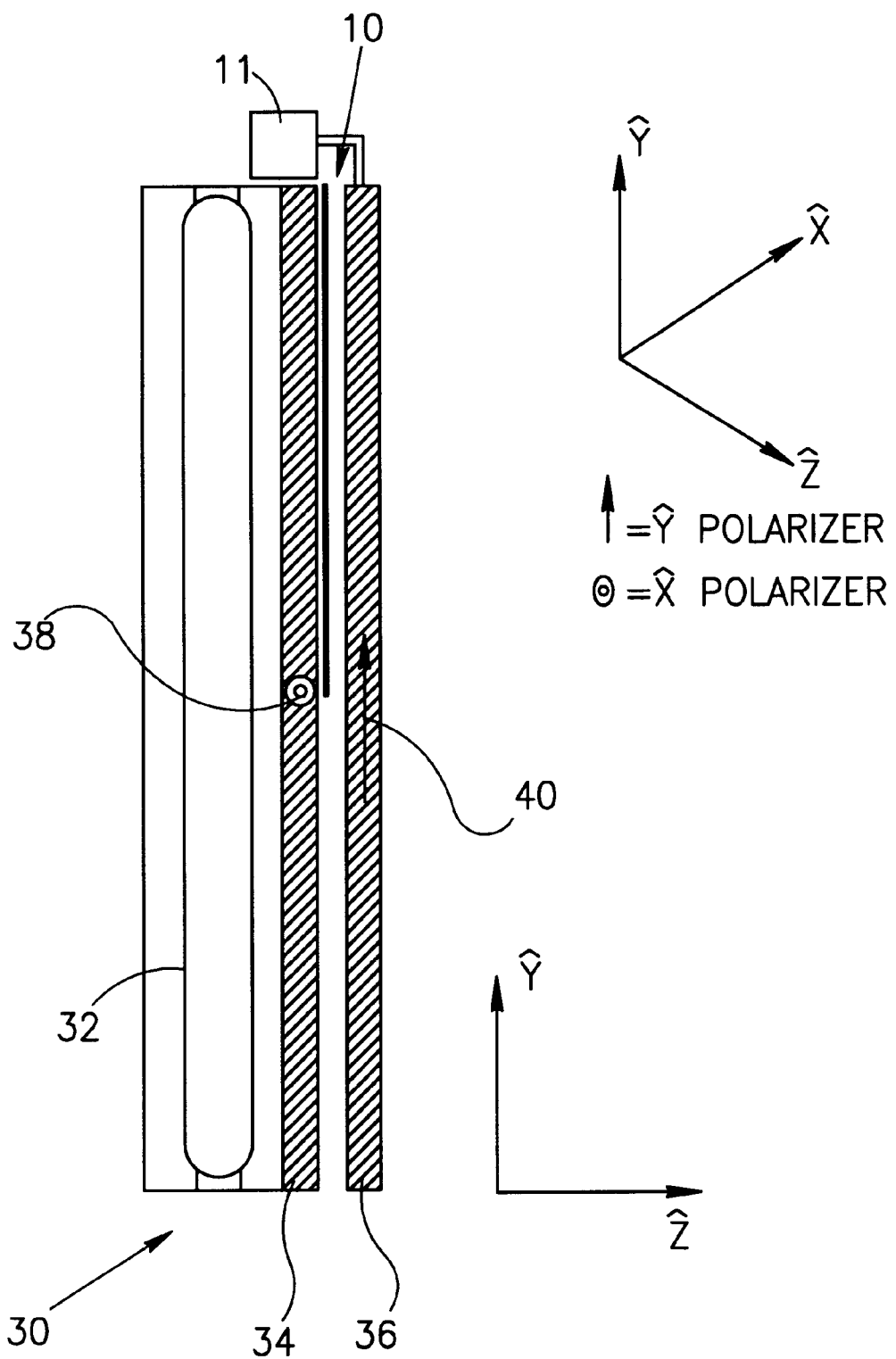
FIG. 2A is a schematic side view of a viewbox according to a preferred embodiment of the present invention.
Figure 2B:
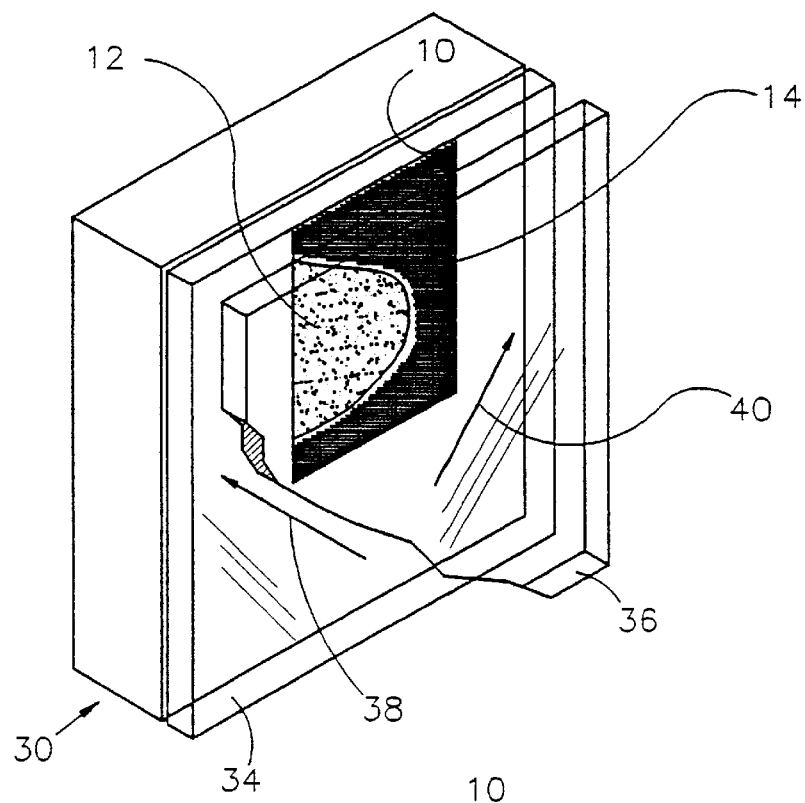
FIG. 2B is a schematic perspective view of the viewbox shown in FIG. 2A.

FIG. 2A shows a side view of a viewbox 30 according to a preferred embodiment of the invention. A light source 32 back illuminates transparency 10 through a polarizer 34. A polarizer 36 is mounted in front of transparency 10. FIG. 2B shows a perspective view of viewbox 30, showing polarizers 34 and 36 having crossed polarization axes 38 and 40 respectively.

Figure 2C:
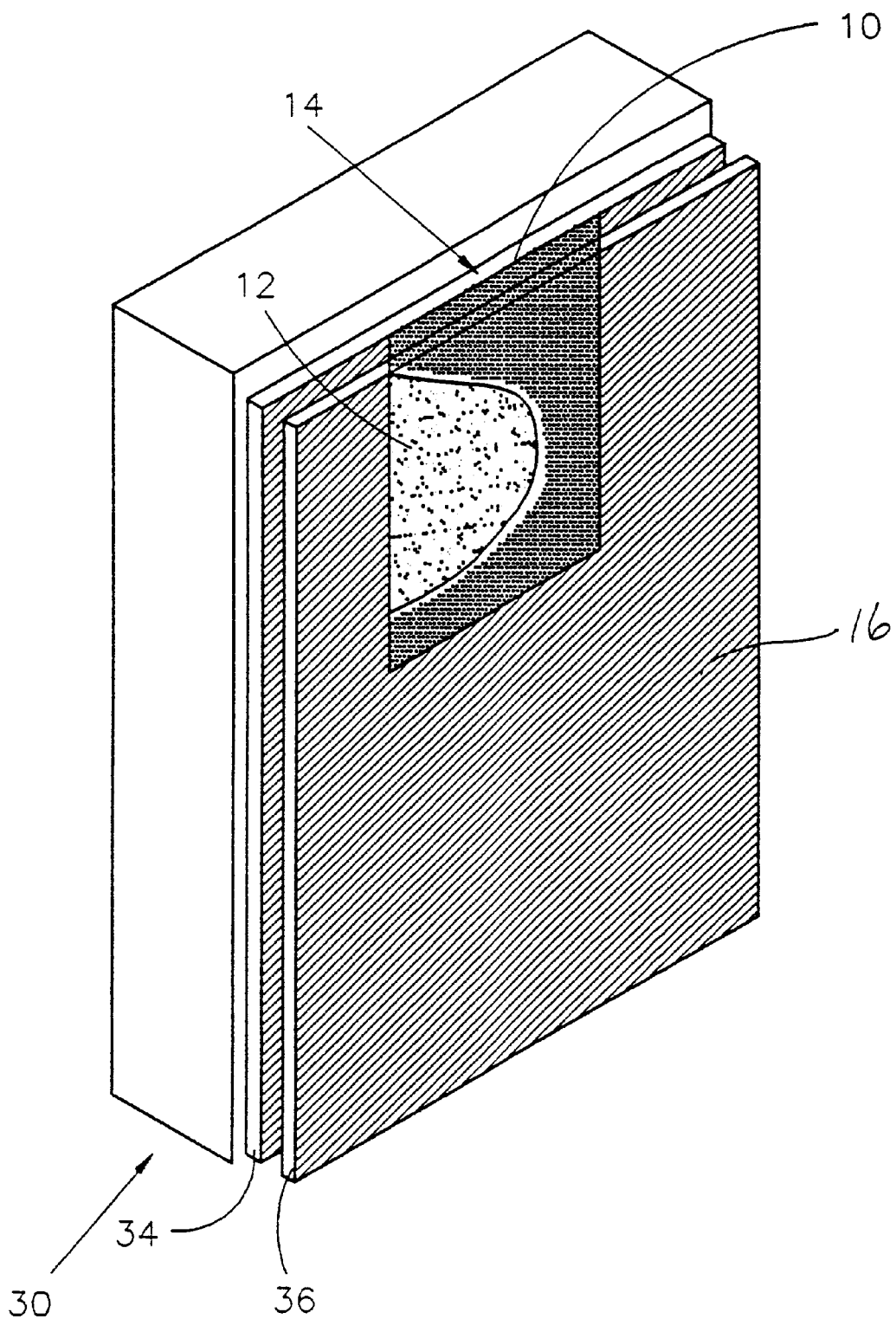
FIG. 2C shows the viewbox of FIG. 2B during operation.

FIG. 2C shows viewbox 30 in operation. As shown in FIG. 2C, the areas of display 16 which do not contain film are dark, since the crossed polarizers 34 and 36 block light generated by light source 32. Light areas 12 now appear lighter than portions of polarizer 36 which are not directly over portions of transparency 10.

Figure 3:
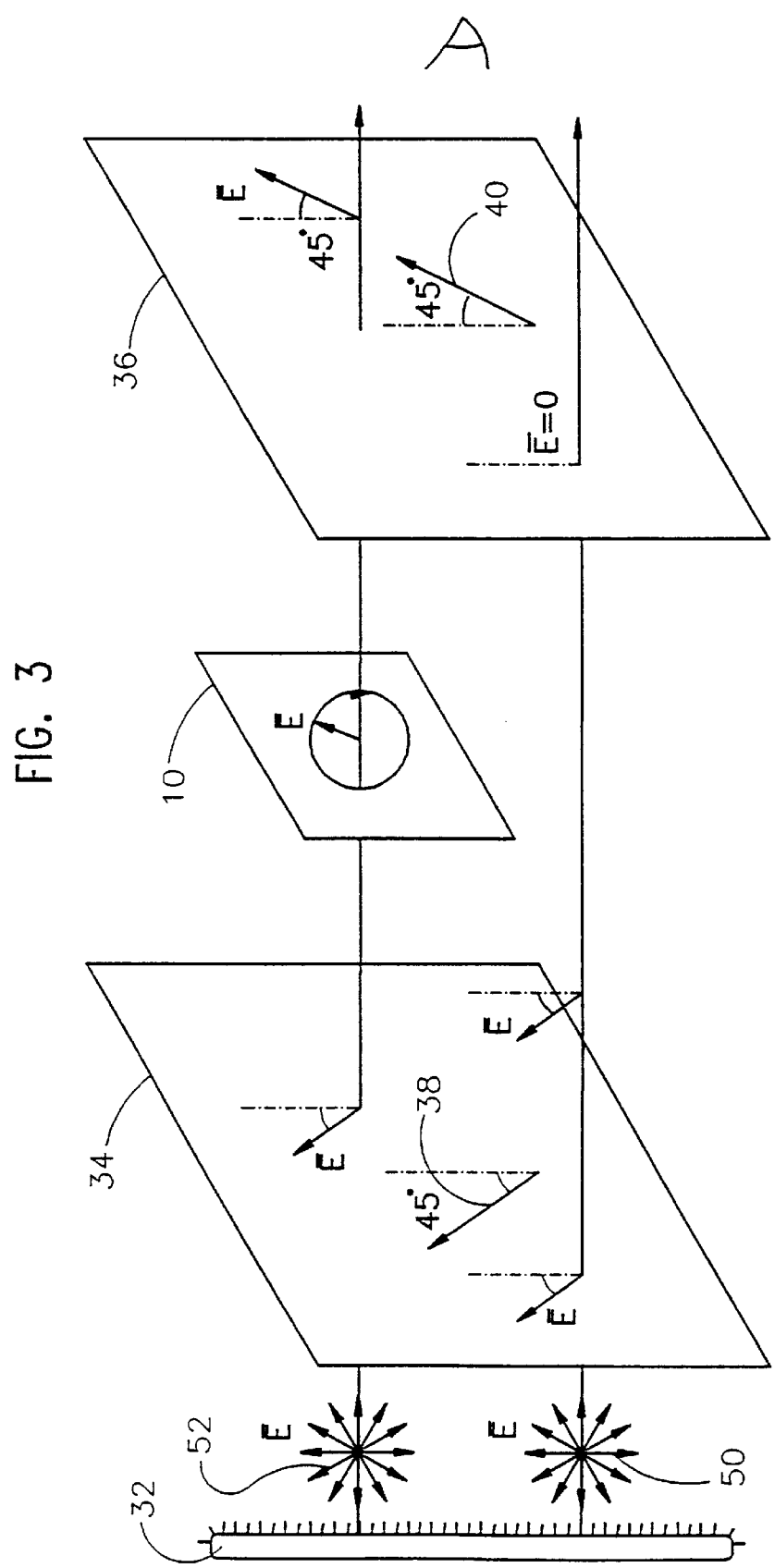
FIG. 3 shows the effect of a transparency on polarized light in a viewbox of the invention.

FIG. 3 shows a schematic diagram of operation of the embodiment shown in FIGS. 2A–2C. Light source 32 emits a first light ray 50 and a second light ray 52. Before passing through polarizer 34, both ray 50 and ray 52 are unpolarized. After passing through polarizer 34, both ray 50 and ray 52 are linearly polarized parallel to polarization axis 38 of polarizer 34. Ray 50 is then substantially attenuated by polarizer 36, because polarization axis 40 of polarizer 36 is perpendicular to the polarization axis of ray 50. Ray 52 passes through transparency 10 which changes the polarization of ray 52, either by rotating the polarization axis of ray 52 or by converting it to elliptically polarized light. Ray 52 is less attenuated by polarizer 36 because it has a field component which is parallel to polarization axis 40.

Polarization axes 38 and 40 are preferably at 45° to the vertical orientation of viewbox 30. The inventors have found that if transparency 10 is placed so that its edges are parallel to polarization axes 38 and 40, light passing through transparency 10 is still substantially attenuated by polarizer 36. However, when there is a substantial angle between the edges of transparency 10 and polarization axes 38 and 40, light passing through transparency 10 is much less attenuated and the contrast with uncovered portions of display 16 is high.

Most transparencies used for X-ray imaging are cut from a stretched plastic sheet and are, therefore, usually bi-refringent with a preferred retardation axis in the direction of the stretching in the original plastic sheets. The behavior of polarized light passing through a bi-refringent film can be explained by projecting the light polarization vector of the polarized light onto the retardation axes of the bi-refringent film. Since the film is bi-refringent, the portion of the light polarization vector projected onto one retardation axis is retarded more than the portion of the light vector which is projected onto the other retardation axis. Thus, linearly polarized light is converted into elliptically polarized light. However, if the polarized light is parallel to one of the retardation axes of the bi-refringent film, there is no differential retardation, and the polarized light is not affected by the film.

The inventors believe that the effect of transparency 10 in the apparatus of FIGS. 2A–2C is that of a bi-refringent film. Thus, if transparency 10 is oriented so that its preferred retardation axis (the stretch direction of the plastic sheet) is parallel to polarization axis 38 or 40, it will not substantially affect the polarization of ray 52. Therefore, polarizer 36 will attenuate ray 52 by almost the same amount that ray 50 is attenuated. The net effect will then be to have a black background and a black film.

Since transparencies are usually cut rectangularly, with their edges parallel or perpendicular to the stretch direction of the plastic sheet, most transparencies have their preferred retardation axis parallel to one of their edges. Transparencies are usually viewed so that their edges are parallel or perpendicular to the vertical. Thus, it is preferred to orient polarizers 34 and 36 so that polarization axes 38 and 40 are at 45° to the vertical in order to ensure that transparencies are not placed so that their preferred retardation axis is parallel or perpendicular to polarization axes 38 and 40.

It should be appreciated that an angle other than 45° between the transparency's preferred retardation axis and the polarization axes of the polarizers may result in optimal contrast between transparency 10 and display surface 16, depending on the type of transparency used. However, 45° provides a reasonable amount of contrast and is a preferred engineering solution. In principle, the angle between polarization axes 38 and the vertical may be any angle greater than 0°, preferably, over 10°, most preferably, more than 30°. It should be understood that while crossed polarizers at an optimal angle to the transparency edge give an optimal contrast, they also cause moire like effects. In addition, the angle between polarization axis 38 and polarization axis 40 can have any value between 10° and 90°, preferably more than 70°. Reducing the cross polarization angle will reduce this effect at the expense of less optimal darkening of the background.

The plastic materials from which transparency 10, polarizer 34 and polarizer 36 are typically formed, are usually unevenly stressed. Thus, the polarization and retardation properties of transparency 10, polarizer 34 and polarizer 36 are irregular and usually cause moire-like patterns to be overlaid on the light passing through transparency 10. In a preferred embodiment of the present invention, at least one and preferably both of polarizers 34 and 36 pass light that is polarized perpendicular to their polarization axes, i.e., they leak. The leakage of light usually washes out the moire patterns because the leaking light has a higher intensity than the moire patterns.

In another preferred embodiment of the present invention, polarizer 34 and/or polarizer 36 are mechanically jittered by means shown schematically at reference 11 in FIG. 2A so that the angle between polarization axis 38 and polarization axis 40 changes. Preferably, polarizer 34 is jittered at over 10 Hz, so that the jittering is not perceived by the viewer. Alternatively, both polarizer 34 and polarizer 36 are jittered relative to transparency 10.

Figure 4:
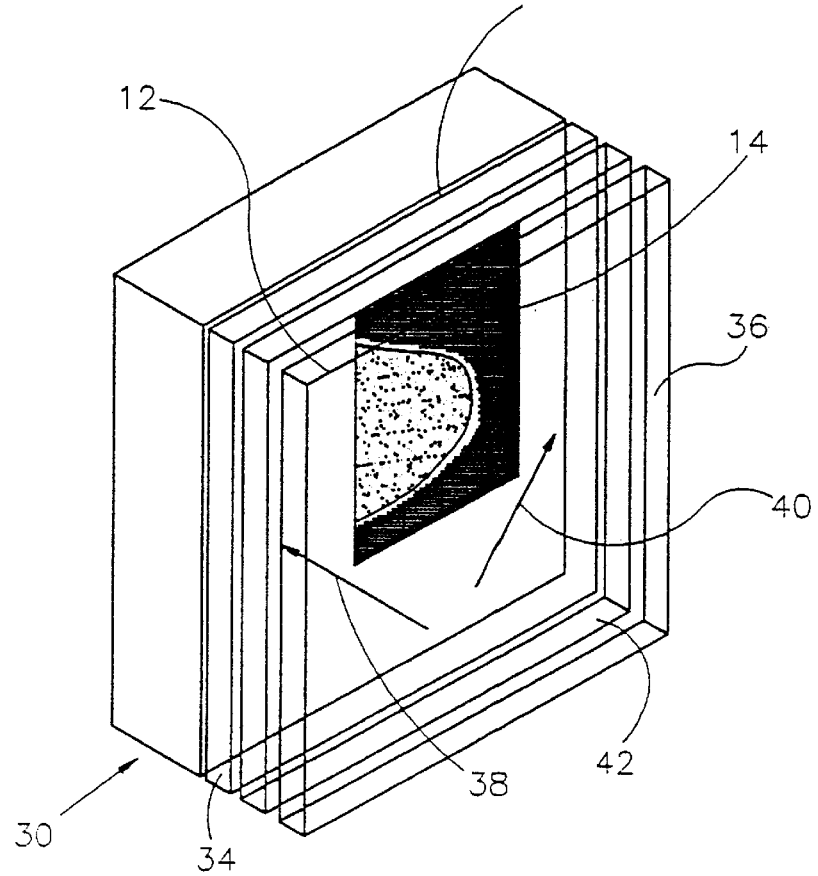
FIG. 4 shows a preferred embodiment of the invention wherein the polarized light is jittered.

FIG. 4 shows an additional preferred embodiment of the invention, wherein an LPR (Light Polarization Rotator) 42 is placed between polarizer 34 and polarizer 36, preferably between polarizer 34 and transparency 10. LPR 42 rotates incident light, in effect, jittering the polarization axis of the light passing through polarizer 34 instead of jittering polarizer 34 itself. Preferably, LPR 42 is an LC (Liquid Crystal) without face polarizers. Alternatively, a diffuser is placed between polarizer 34 and polarizer 36, preferably in place of LPR 42. The diffuser slightly depolarizes polarized light, so that enough light passed through polarizer 36 to wash out the moire patterns.

Figure 6:
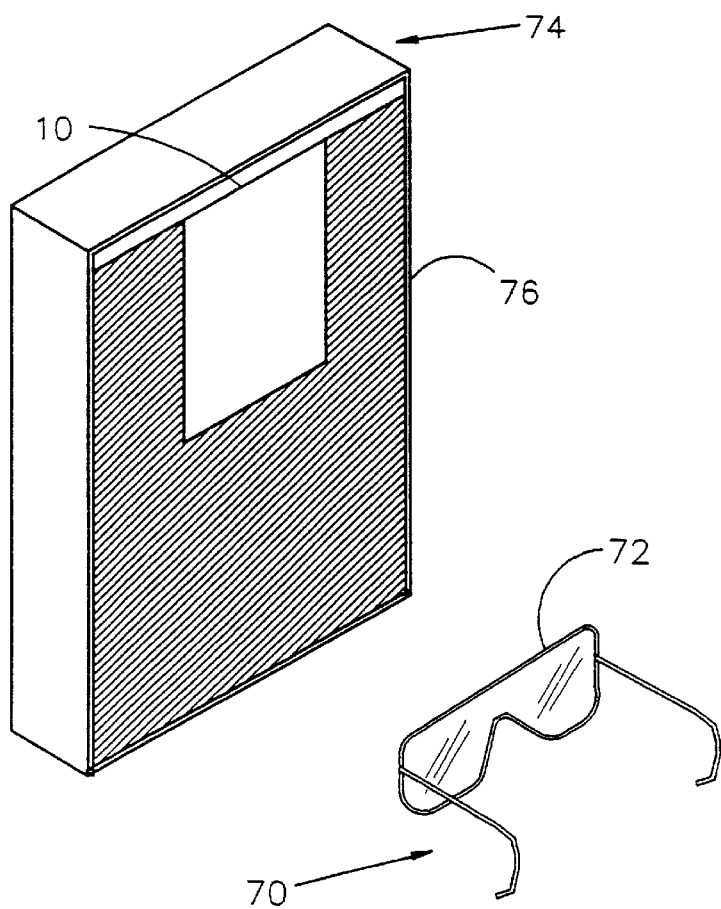
FIG. 6 shows another preferred embodiment of the preset invention using polarizing glasses.

FIG. 6 shows another preferred embodiment of the present invention. A viewbox 74 has a single polarizer 76 on its display surface. Transparency 10 is viewed using a pair of glasses 70 having polarizing lens 72. As before, the polarization axis of lens 72 is perpendicular to the polarization axis of polarizer 76.

Figure 5:
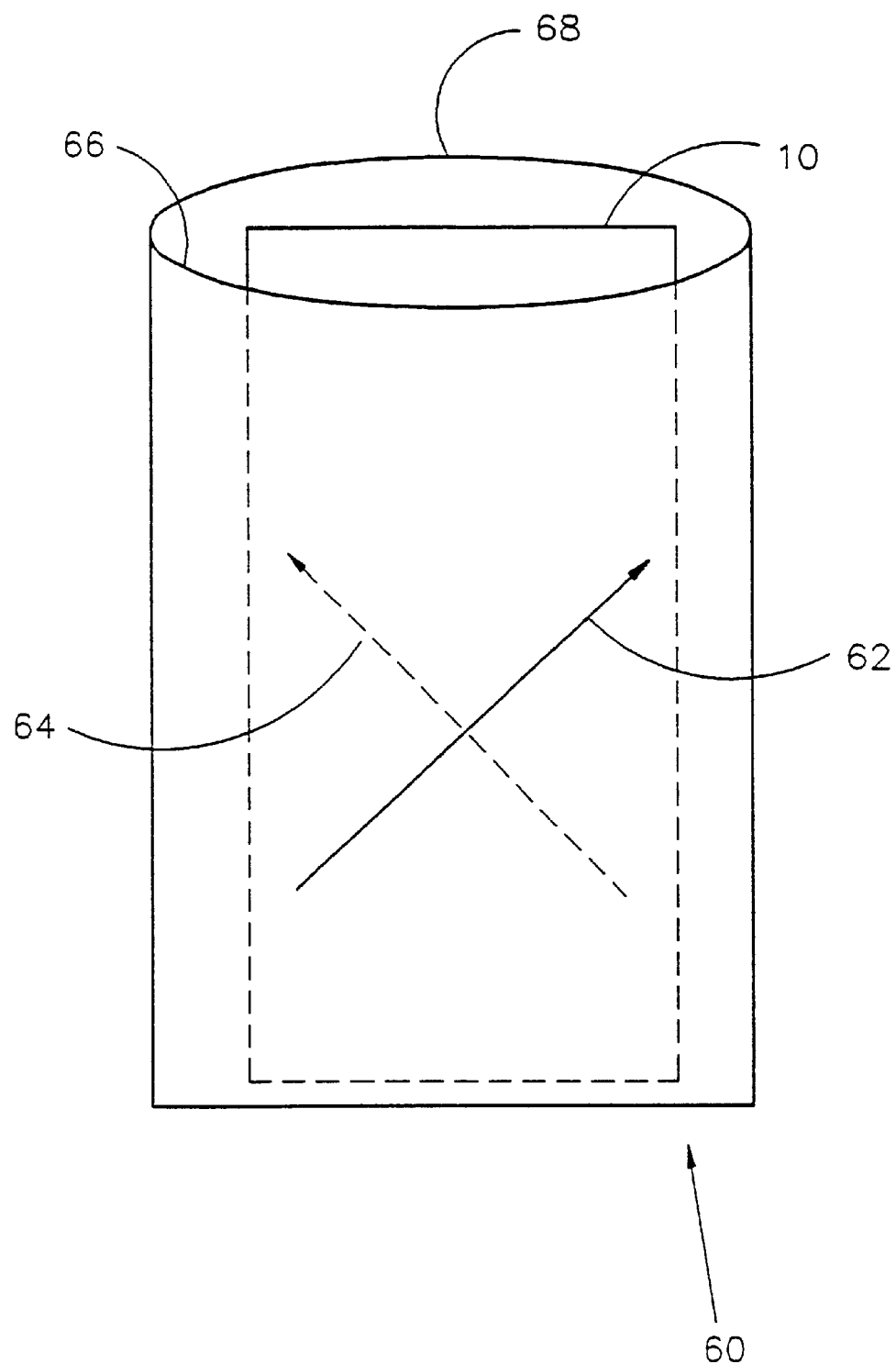
FIG. 5 shows an envelope according to another preferred embodiment of the present invention.

FIG. 5 shows an envelope 60 according to another preferred embodiment of the present invention. Envelope 60 has a front face 66, formed from a polarizing material with a polarization axis 62 and a back face 68 with a crossed polarization axis 64. When transparency 10 is placed inside envelope 60 and held against a light, such as a prior art viewbox, only the portion of envelope 60 which overlays transparency 10 passes light. Preferably, envelope 60 is formed of one polarizer which is folded in half at 45° to its polarization axis, cut and sealed. A preferred envelope is the size of a prior art viewbox, so that all of the viewbox surface is covered and no light escapes to dazzle an operator.

Alternatively, only front 66 of envelope 60 is a polarizer, and back 68 is not a polarizer. This type of envelope is preferably viewed on a viewbox which has only one polarizer, such as viewbox 74, in FIG. 6. Preferably, polarization axis 62 is perpendicular to the polarization axis of polarizer 76 in viewbox 74. If the clear material forming back 68 has a preferred retardation axis, this preferred retardation axis is preferably oriented to be parallel or perpendicular to polarization axis 62, so that it does not substantially affect the polarization of light passing through it.

Figure 7:
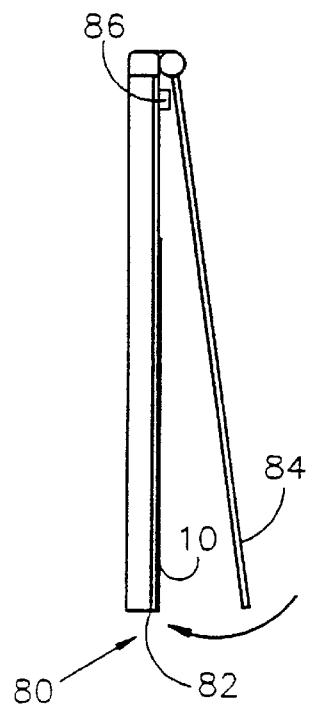
FIG. 7 shows a side view of a preferred embodiment of the present invention with a top opening cover.

Since a typical viewing time of transparency 10 by a physician is between 5 and 40 seconds, an important consideration in viewbox design is the ease of mounting transparency 10 on the viewbox. FIG. 7 shows a viewbox 80 with a top hinged cover 84 according to a preferred embodiment of the present invention. Transparency 10 is placed on display surface 82 which incorporates a polarizer. Door 84, on which the complementary polarizer is mounted, is then lowered down to cover transparency 10 and enable viewing of transparency 10. Preferably, a switch 86 controls the backlighting so that it is only on when cover 84 is down. Thus, an operator using viewbox 80 is not dazzled every time he opens cover 84.

FIG. 8 shows a viewbox 90 with a side hinged cover 94 according to another preferred embodiment of the present invention. Transparency 10 is placed on a polarizing display surface 92 with a polarization axis 96. Then cover 94 on which is mounted a polarizer with a polarization axis 98 is closed and transparency 10 is viewed. Alternatively, transparency 10 is mounted on cover 94.

Alternatively, sliding covers are used instead of top or side hinged covers.

FIG. 9A and 9B show a viewbox 100 according to another preferred embodiment of the present invention. Viewbox 100 has a polarizer 102 mounted on its display surface. A second polarizer 104 is mounted so that a narrow space is formed between polarizer 104 and polarizer 102. This space functions as a transparency receptacle. FIG. 9A shows transparency 10 inserted from the top slit of the narrow space and resting on a stop 106. In FIG. 9B, stop 106 is opened so that transparency 10 falls out of viewbox 100 to make room for another transparency. Preferably, stop 106 is movable so that it is not near the bottom of viewbox 100. Instead, if a short transparency is inserted into viewbox 100, stop 106 is raised so that the short transparency will be viewable near the upper portion of viewbox 100.

Figure 9C:
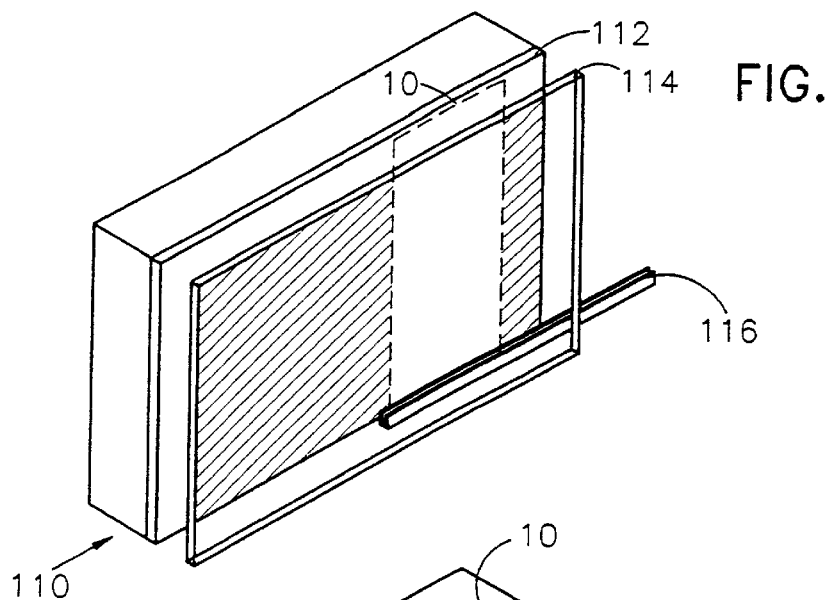
Figure 9D:
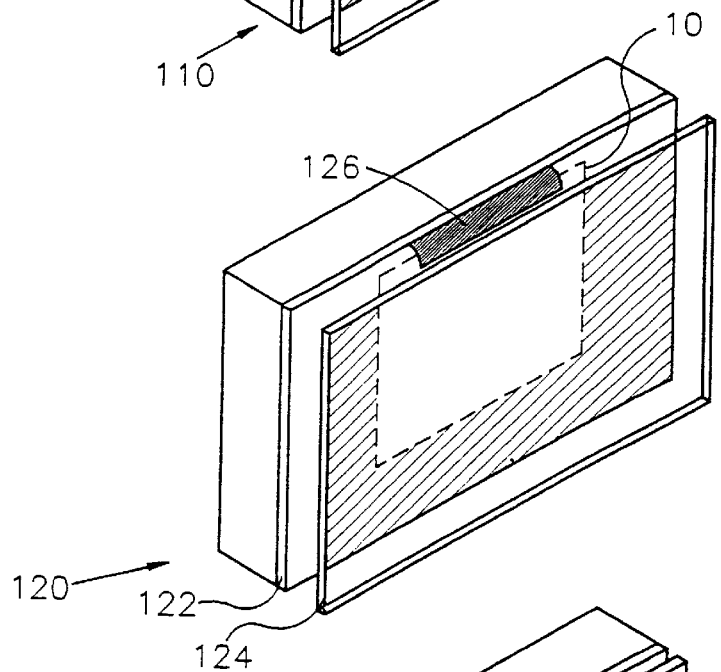

FIG. 9C shows another preferred embodiment of the present invention, wherein transparency 10 is mounted on a slider 116 and slid into the narrow space. FIG. 9D shows another preferred embodiment of the present invention, wherein transparency 10 is mounted on a clip 126 and slipped into the top of the narrow space. Since clip 126 is wider than the narrow space, transparency 10 does not fall into the narrow space. Transparency 10 is removed by grasping and lifting clip 126.

Figure 9E:
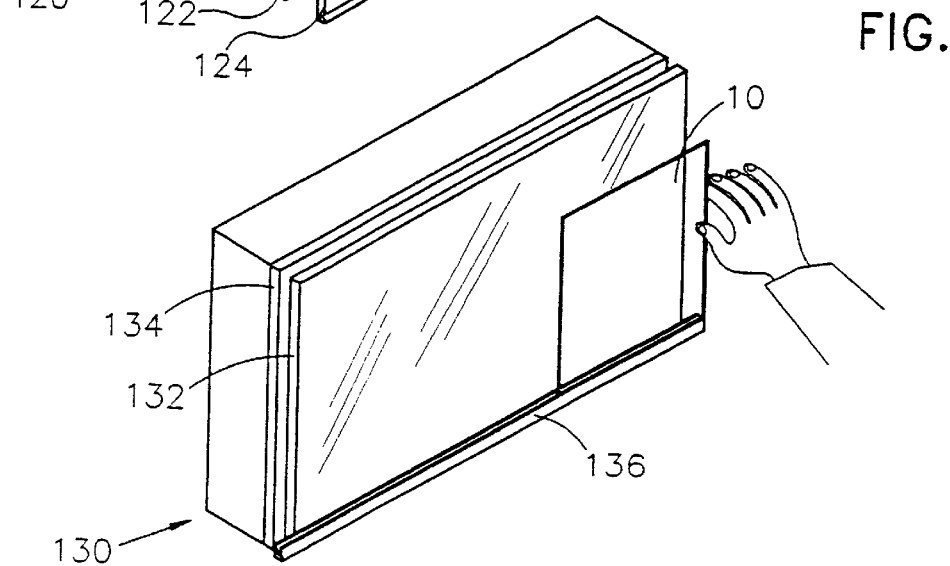

FIG. 9E shows yet another preferred embodiment of the present invention, wherein a viewbox 130 has a ledge 136 on the bottom of the narrow space between a polarizer 132 and a polarizer 134. Transparency 10 is slipped by an operator into the narrow space. Usually transparency 10 is placed so that it partially protrudes out of the narrow space, to aid retrieval. Alternatively, an extension tab is attached to transparency 10, and only that tab protrudes from the narrow space.

Alternatively a retractable transparency receptacle is used to insert transparency 10 from the bottom of the narrow space. Preferably the receptacle has counter weights or a counter spring so that it is naturally in the up position. Alternatively, when the slide is brought up to insert transparency 10 into the narrow space, it is held in place by special catches.

In another preferred embodiment of the present invention, a mechanical feeder, preferably motorized, is used to convey transparencies into the narrow space. During operation of the viewbox, the operator places the transparency on the feeder and the transparency is brought into the narrow space between the two polarizers. Removal of the transparency is by reverse operation of the feeder. Preferably, the feeder is activated by a push button or by a micro-switch sensitive to the placement of objects on the feeder.

Figure 10:
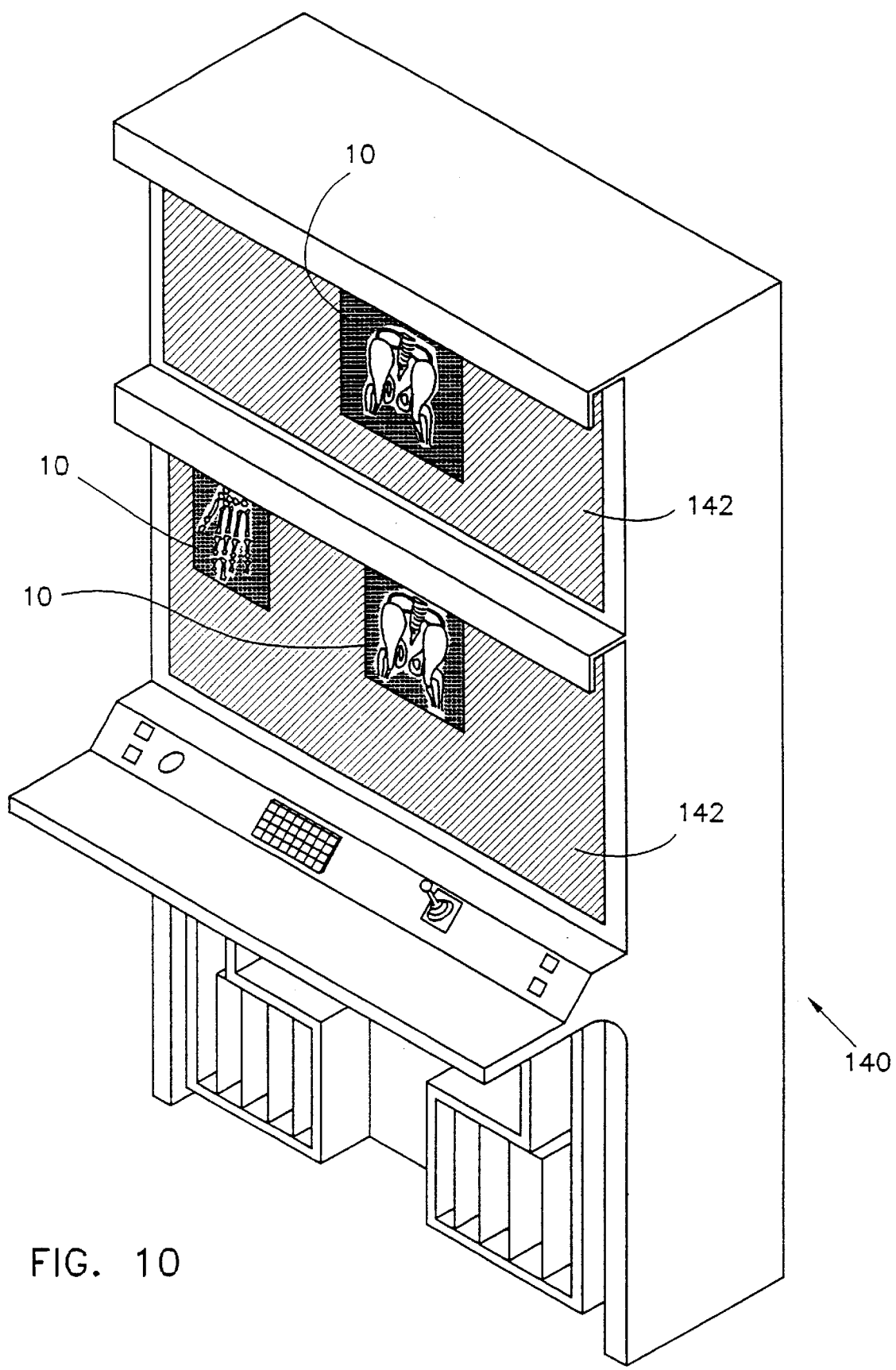
FIG. 10 shows an alternating viewbox according to a preferred embodiment of the present invention.

FIG. 10 shows an alternator 140 according to a preferred embodiment of the present invention. It is well known in the art to use an alternator to show a large number of transparencies to an operator. A mechanism in alternator 140 moves the transparencies so that they are in front of a display surface of the alternator. A first polarizer (not shown) is mounted over the display surface, behind the location where the transparencies are displayed. Alternatively, the backlighting is polarized. In the prior art, the transparencies are usually mounted such that the operator can remove any transparency which appears interesting. In the present embodiment, a second polarizer 142 is placed over the display surface, in a manner which does not impede the mechanism from moving the transparencies. In an alternator wherein the transparencies are mounted on a clear moving film, preferably the film is a polarizer. Alternatively, especially when the film comprises stretched plastic, the film is adapted, such as by orienting its preferred retardation axis, so that it does not effect polarized light passing through it.

It should be appreciated that most alternators can be adapted to the present invention by the addition of two crossed polarizers to the display mechanism.

It should be appreciated that the above disclosed embodiments, the polarizer behind transparency 10 is replaceable by a polarized light source with a desired polarization axis, for example, an LCA based viewbox as described in the previously cited PCT/WO91/10152. Also, the polarizer may be mounted behind the display surface instead of on top of it. In addition, various combinations of the embodiment described are also anticipated. For example, jittering polarizer 76 in viewbox 74.

It will be appreciated by persons skilled in the art that the present invention is not limited by what has been particularly shown and described herein. Rather, the scope of the present invention is defined only by the claims which follow:

What is claimed is:

1. A method for viewing a transparency comprising:

backlighting said transparency with polarized light having a backlighting polarization axis;

viewing said polarized light through a polarizer having a polarizer polarization axis; and jittering at least one of the polarizer and the backlighting polarization axes.

2. A method according to claim 1 wherein the transparency is rectangular and placed with one side of the transparency being vertical and wherein the polarizer and backlighting polarization axes are at about 45 degrees to the vertical.

3. A method according to claim 1 wherein the polarizer is mounted on eye-glasses.

4. A method according to claim 1 wherein the polarization between the polarizer and backlighting polarization axes is imperfect, such that a quantity of light sufficient to hide Moiré patterns which may be produced when viewing the transparency leaks through the polarizer.

5. Apparatus for transparency viewing comprising:

a polarized light source having a source polarization axis;

a polarizer, having a polarizer polarization axis; and a transparency holder adapted to hold a transparency between the polarizer and the polarized light source, wherein cross-polarization between the polarization axes is imperfect, such that a quantity of light sufficient to hide Moiré patterns which may be produced when viewing the transparency, leaks through the polarizer, wherein the polarized light source comprises:
a light source; and
a spatial masking apparatus which selectively polarizes or attenuates incident light.

6. Apparatus according to claim 5 wherein said imperfect cross-polarization is caused by either (a) said polarizer passing said sufficient quantity of light polarized at 90 degrees to the polarizer polarization axis or (b) said polarized light source producing an amount of light having a polarization perpendicular to the source polarization axis, such amount of light being sufficient to hide patterns which may be produced when viewing the transparency through the polarizer.

7. Apparatus according to claim 6, wherein said imperfect cross-polarization is caused by both of (a) said polarizer passing said sufficient quantity of light polarized at 90 degrees to the polarizer polarization axis and (b) said source producing an amount of light having a polarization perpendicular to the source polarization axis, such amount of light being sufficient to hide patterns which may be produced when viewing the transparency through the polarizer.

8. Apparatus according to claim 5 and comprising means to jitter said polarized light in a manner effective to reduce patterns which may be produced when viewing the transparency through the polarizer.

9. Apparatus according to claim 5 and comprising a diffuser mounted between the polarizer and said polarizing light source.

10. Apparatus according to claim 5 wherein the polarizer is mounted on a cover and wherein the cover covers the transparency when the cover is closed.

11. Apparatus according to claim 5 wherein the source polarization axis is at an angle of about 90 degrees to the polarizer polarization axis.

12. Apparatus according to claim 5 wherein the source polarization axis and the polarizer polarization axis are at about 45 degrees to the vertical.

13. Apparatus according to claim 5 wherein said polarizer is mounted on eye-glasses.

14. Apparatus according to claim 5 wherein the spatial masking apparatus comprises:
a Liquid Crystal Array, LCA; and
at least one face polarizer.

15. Apparatus according to claim 5 and comprising means to jitter said polarizer in a manner effective to reduce patterns which may be produced when viewing the transparency through the polarizer.

16. Apparatus according to claim 5 wherein the quantity of light is sufficient to hide patterns which may be produced when viewing a transparency containing a medical image through the polarizer.

17. Apparatus for transparency viewing comprising:
a polarized light source having a source polarization axis;
a polarizer, having a polarizer polarization axis,
a transparency holder which holds a transparency between the polarizer and the polarized light source,
means for jittering at least one of said polarized light and said polarizer in a manner effective to reduce patterns which may be produced when viewing the transparency through the polarizer.

18. Apparatus according to claim 17 wherein the source and polarizer polarization axes are offset from each other by a difference angle and the means for jittering comprises means for providing a rotational jittering component that changes the difference angle.

19. Apparatus according to claim 18 wherein the means for jittering comprises a Light Polarization Rotator, LPR.

20. Apparatus according to claim 19 wherein the LPR comprises a liquid crystal without polarizers.

21. Apparatus according to claim 17 wherein the polarized light source comprises a light source and an initial polarizer and wherein the means for jittering comprises mechanical means to angularly jitter the polarizer or the initial polarizer.

22. Apparatus according to claim 17 wherein the source polarization axis is at an angle of about 90 degrees to the polarizer polarization axis.

23. Apparatus according to claim 17 wherein the source polarization axis and the polarizer polarization axis are at about 45 degrees to the vertical.

24. Apparatus according to claim 17 wherein said polarizer is mounted on eye-glasses.

25. Apparatus according to claim 17 wherein the polarized light source comprises:
a light source; and
a spatial masking apparatus which selectively polarizes or attenuates incident light.

26. Apparatus according to claim 20 wherein the source polarization axis is at an angle of about 90 degrees to the polarizer polarization axis.

27. Apparatus according to claim 20 wherein the source polarization axis and the polarizer polarization axis are at about 45 degrees to the vertical.

28. Apparatus according to claim 20 wherein said polarizer is mounted on eye-glasses.

29. Apparatus according to claim 20 wherein the polarized light source comprises:
a light source; and
a spatial masking apparatus which selectively polarizes or attenuates incident light.

* * * * *